United States Patent [19]

Spencer et al.

[11] Patent Number: 5,042,586
[45] Date of Patent: Aug. 27, 1991

[54] TRACTOR DRAFT FORCE SENSOR

[75] Inventors: Keith L. Spencer, Cedar Falls; Dennis A. Bowman, Waterloo, both of Iowa

[73] Assignee: Deere & Company, Moline, Ill.

[21] Appl. No.: 627,789

[22] Filed: Dec. 14, 1990

[51] Int. Cl.$^5$ .................. A01B 63/112; B60C 1/58
[52] U.S. Cl. ..................... 172/7; 280/446.1; 73/862.57
[58] Field of Search ............... 172/7, 11, 239, 10, 172/12, 261; 280/446.1; 73/862.54, 862.59, 862.57, 862.64

[56] References Cited

U.S. PATENT DOCUMENTS

| | | |
|---|---|---|
| 1,528,627 | 3/1925 | Peters . |
| 3,342,274 | 9/1967 | Wridt, Jr. . |
| 3,375,876 | 4/1968 | Englemann . |
| 3,509,943 | 5/1970 | Schowalter . |
| 3,516,498 | 6/1970 | Schowalter . |
| 3,722,598 | 3/1973 | Peterson ................... 172/10 |
| 3,812,916 | 5/1974 | Lasoen ..................... 172/7 |
| 3,999,427 | 12/1976 | Decker et al. ............. 73/862.64 |
| 4,059,159 | 11/1977 | Moorhouse et al. . |
| 4,081,996 | 4/1978 | Jennings et al. .......... 172/7 |
| 4,185,697 | 1/1980 | Berg ........................ 172/10 |
| 4,206,813 | 1/1980 | Mueller, Jr. et al. ...... 172/7 |
| 4,260,025 | 4/1981 | Gregorio ................... 172/12 |
| 4,397,359 | 8/1983 | Price et al. ................ 172/7 |
| 4,422,341 | 12/1983 | Espirito-Santo et al. . |
| 4,510,814 | 4/1985 | Espirito-Santo et al. ... 73/862.64 |

OTHER PUBLICATIONS

Deere & Co., "Group 25, Theory of Operation, Three-Point Hitch Operation", TM-1461, pp. 270-25-1 to 270-25-8, 1989.

Primary Examiner—Dennis L. Taylor
Assistant Examiner—Spencer K. Warnick, IV

[57] ABSTRACT

An articulated tractor has left and right laterally spaced apart, fore-and-aft extending side frame members which are rigidly attached between front and rear drawbar supports. The tractor also includes left and right draft links, each draft link having a front end coupled to a corresponding one of the side frame members and a rear end for coupling to an implement. A draft force sensing mechanism includes a displacement transducer mounted on one of the side frame members. A lever is pivotally mounted near the transducer and carries a plunger or shaft which operatively engages the transducer. A rod has a first end fixed to the other side frame member and a second end coupled to the lever so that changes in draft force cause deflection of the side frame members and movement of the lever relative to the transducer. The transducer responds by generating a signal representing the draft force. Movement of the rod is amplified by the lever.

5 Claims, 4 Drawing Sheets

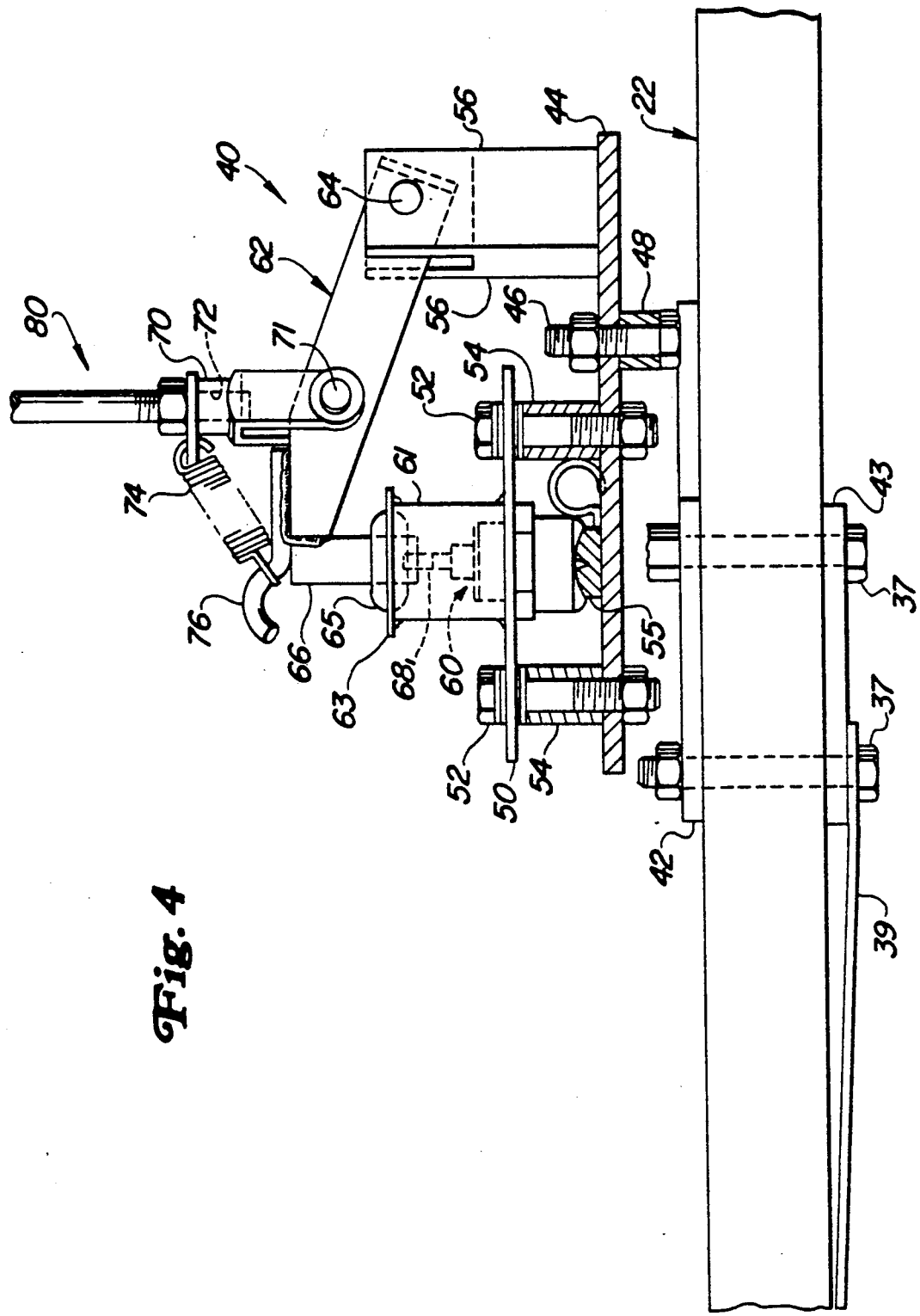

[5,042,586]

TRACTOR DRAFT FORCE SENSOR

BACKGROUND OF INVENTION

The present invention relates to a force sensor for sensing forces, such as the draft forces applied to the implement hitch of an agricultural tractor.

To provide draft control for agricultural tractors a means of measuring the draft force is required. Known draft force measuring mechanisms for tractor draft control systems are described in U.S. Pat. No. 4,059,159, issued in 1977 to Moorhouse et al, in U.S. Pat. No. 3,342,274, issued in 1967 to Wridt, Jr. and in U.S. Pat. No. 3,375,876, issued in 1968 to Engelmann. In these known designs the draft forces are applied to laterally spaced apart spring members and the deflection of the spring members is measured to provide a signal indicative of the draft force. However, none of these designs is practicable for use in certain production articulated agricultural tractors wherein the draft links have front ends which are coupled to structural beams which extend between and are rigidly attached to front and rear drawbar supports. Accordingly, a relatively simple, inexpensive and sensitive draft force sensing mechanism is desired for use in such production articulated agricultural tractors.

SUMMARY OF INVENTION

An object of the present invention is to provide a simple, inexpensive and sensitive draft force sensing mechanism for use in a production articulated agricultural tractor.

Another object of the present invention is to provide such a sensor which utilizes a commercially available displacement transducer.

These and other objects are achieved by the present invention wherein a draft force sensor is provided for an articulated tractor. The tractor has left and right laterally spaced apart, for-and-aft extending side frame members which are rigidly attached between front and rear drawbar supports. The tractor also includes left and right draft links. Each draft link has a front end coupled to a corresponding one of the side frame members and a rear end for coupling to an implement. The draft force sensing mechanism includes a displacement transducer mounted on one of the side frame members. A lever is pivotally mounted near the transducer and carries a plunger or shaft which operatively engages the transducer. A rod has a first end fixed to the other side frame member and a second end coupled to the lever so that changes in draft force cause deflection of the side frame members and movement of the lever relative to the transducer. The transducer responds by generating a signal representing the draft force. Movement of the rod is amplified by the lever.

BRIEF DESCRIPTION OF THE DRAWINGS

FIG. 4 is a detailed top view of the draft sensing mechanism of the present invention.

DETAILED DESCRIPTION

Figure 1:
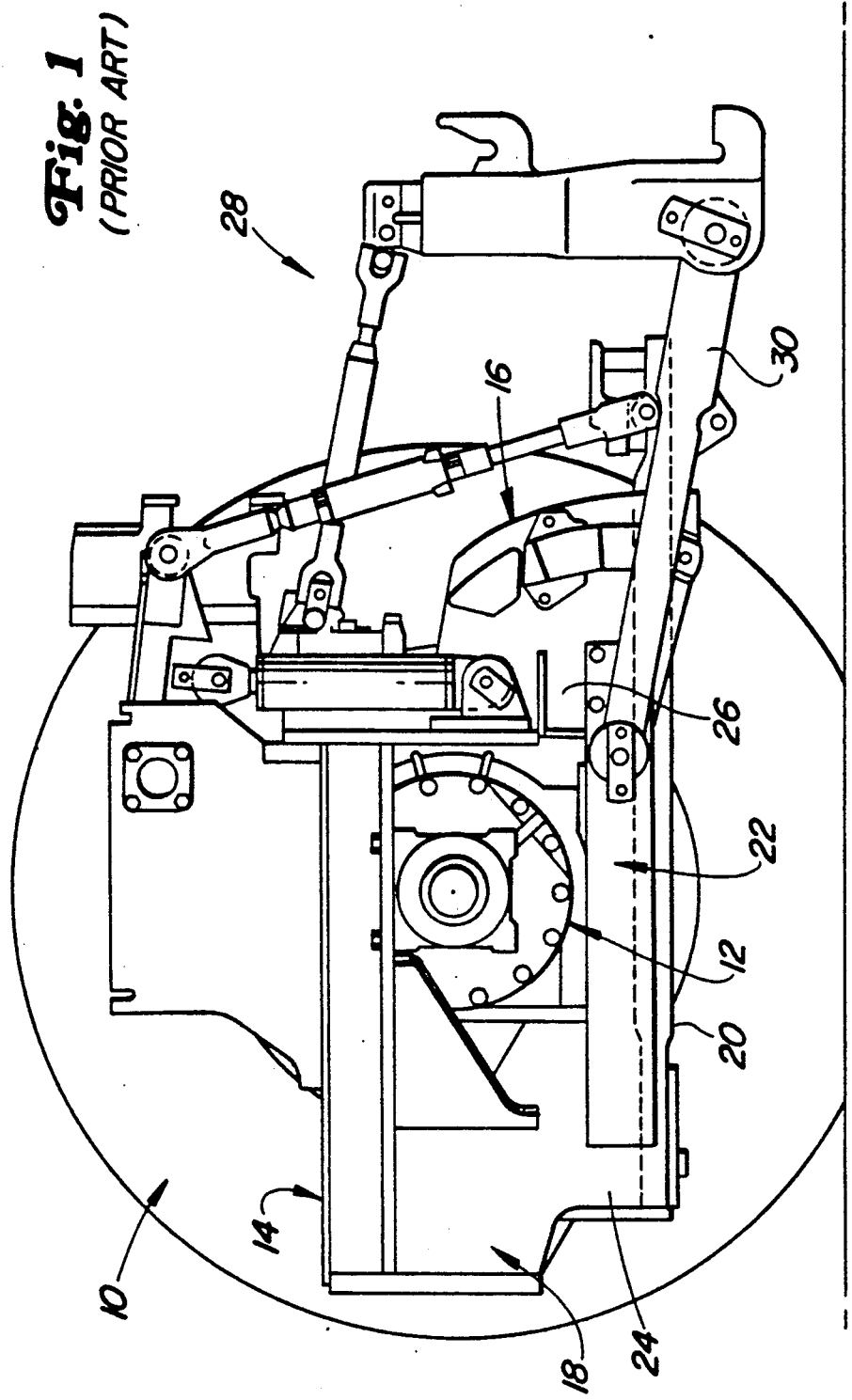
FIG. 1 is a side view of the rear portion of an articulate tractor which illustrates the environment in which the draft sensing mechanism of the present invention may be used.

FIG. 1 shows the rear portion 10 of a known production articulated tractor in which the draft force sensing mechanism of the present invention may be used. This rear portion includes a rear axle housing 12 which supports a rear frame structure 14. A rear drawbar support 16 is attached to the rear end of the frame structure 14 and a front drawbar support 18 is attached to the front end of the frame structure 14. In a known manner, a drawbar 20 is pivotally supported by the front drawbar support 18 and is slidably supported by the rear drawbar support 16.

Figure 2:
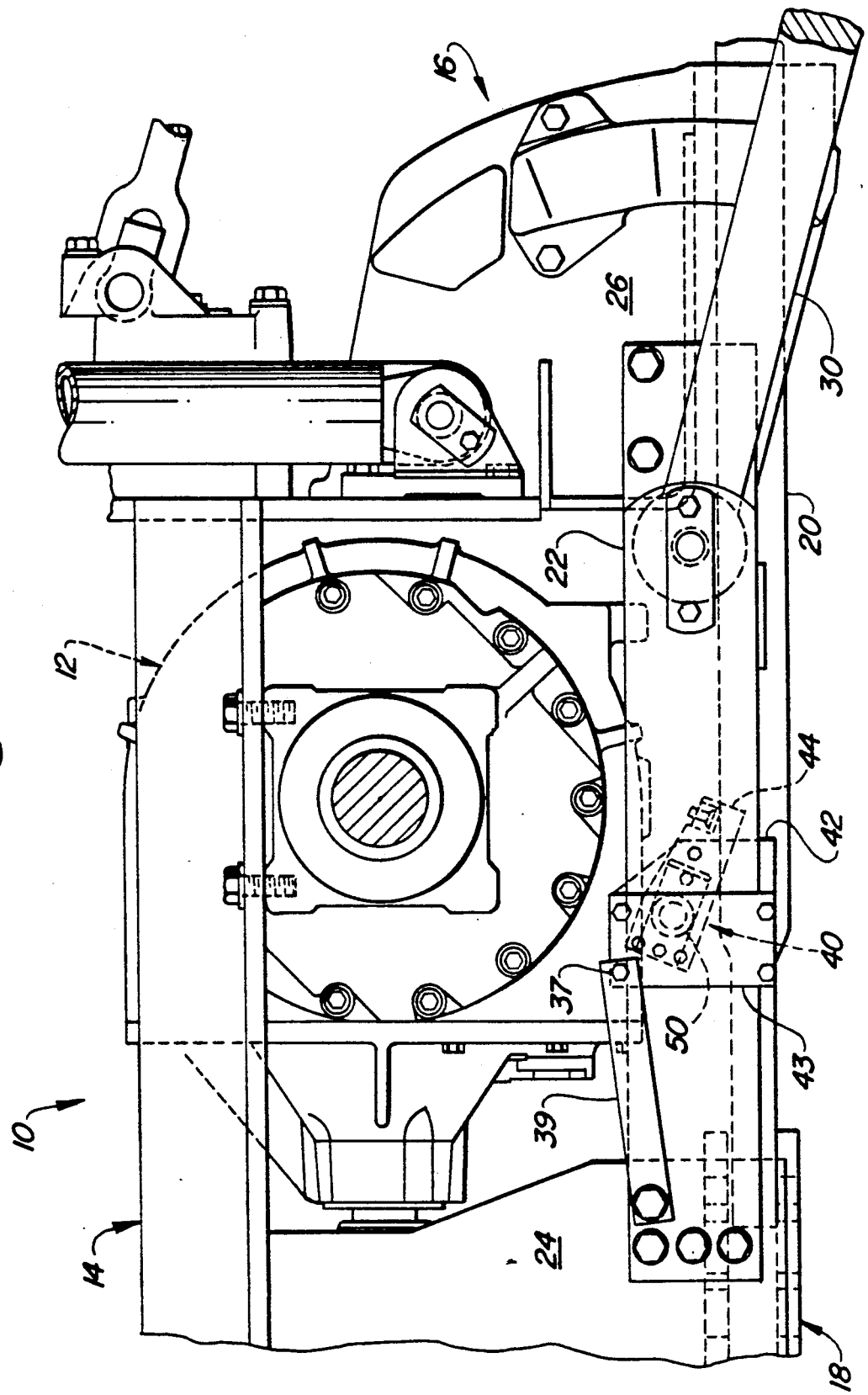
FIG. 2 is a side view of part of the rear portion of an articulated tractor including the draft sensing mechanism of the present invention.
Figure 3:
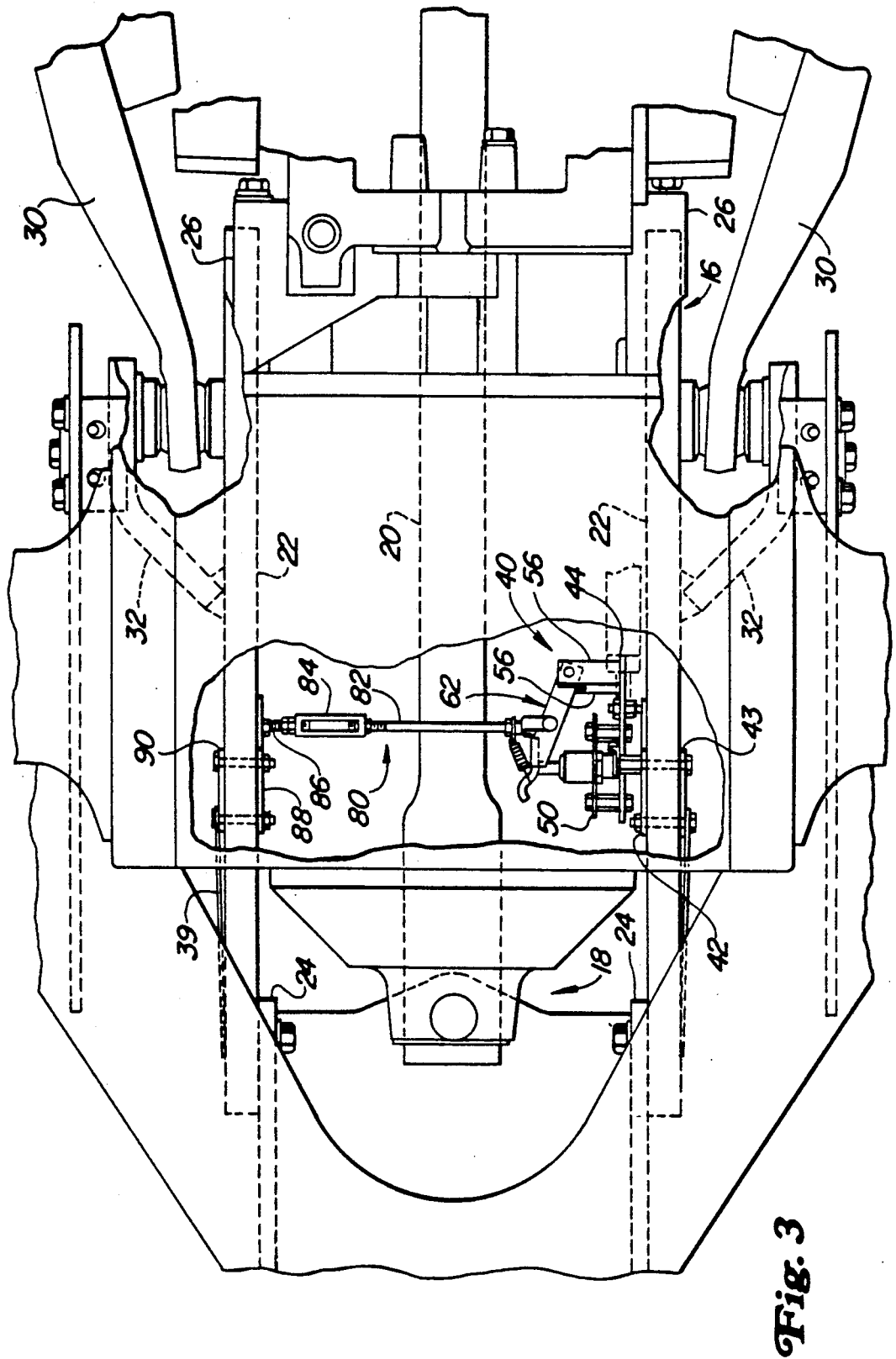
FIG. 3 is a top view of part of the rear portion of an articulated tractor including the draft sensing mechanism of the present invention.

Referring now to FIGS. 1, 2 and 3, the frame structure 14 also includes left and right side beams 22. The front end of each side beam 22 is rigidly bolted to a side plate 24 of the front drawbar support 18 and a rear end of each side beam 22 is rigidly bolted to a side plate 26 of the rear drawbar support 16.

A conventional three-point hitch assembly 28 is also mounted at the rear of the rear frame structure 14. The hitch assembly includes a pair of draft links 30, each of which has a front end which is pivotally coupled to a bracket 32 which projects laterally outwardly from the side of each side beam 22 from a position forward of the rear end of each side beam 22 and forward of the front surface of the rear drawbar support 16.

Now, according to the present invention, a draft force sensing mechanism 40 is mounted between and coupled to the two side beams 22. The draft force sensing mechanism 40 includes an inner mounting plate 42 and an outer mounting plate 43 which are fixed (such as by bolts 37) to opposite sides of one of the side beams 22. A locating plate 39 extends from one of the bolts 37 to one of the bolts which attach the front end of the left side beam 22 to the side plate 24 so that the draft force sensing mechanism 40 can be accurately positioned in the fore-and-aft direction.

A base plate 44 is attached to the inner mounting plate 42 and is held spaced apart therefrom by a triangular arrangement of three bolts 46 and spacers 48, only one of which is shown in the figures for purposes of clarity. A sensor plate 50 is attached to one side of the base plate 44 and is held spaced apart therefrom by a pair of bolts 52 and spacers 54. A spacer/locator 55 is welded to the base plate 44 at a position about midway between the bolts 52. A pair of pivot supports 56 project inwardly from the aft end of base plate 44.

A commercially available transducer 60, such as a linear potentiometer, is mounted in an aperture in the plate 50 so that a tab on the end of the transducer housing 61 is received in a slot in the surface of the spacer/locator 55. The transducer 60 is enclosed in a cylindrical tube 61, one end of which is fixed to the plate 50 in registry with the aperture. A cover plate 63 is fixed to the other end of the cylindrical tube 61. An annular grommet 65 is sealingly received in an opening in the cover plate 63. The transducer 60 may be a rectilinear potentiometer, a linear variable transformer or other electrical device which is sensitive to displacement. A plurality of shims and washers may be placed between the spacers 54 and the plate 50 to hold the transducer 60 firmly against the spacer/locator 55. A lever 62 has one end pivotally coupled to the pivot supports 56 by means of a pin 64. A cylindrical shaft 66 is attached to the other end of the lever 62 so that the shaft 66 operatively engages a pin 68 of the transducer 60 and is slidably and sealingly received by the grommet 65.

A yoke 70 is pivotally coupled to the lever 62 by a pin 71 which is preferably positioned about two thirds of the distance from pin 64 to shaft 66. A threaded bore 72 extends into the inwardly facing end of the yoke 70. A spring 74 is coupled under tension between the yoke 70 and a hook 76 which is attached to the end of the lever 62 and the shaft 66. An adjustable length link 80 is coupled between the right side beam 22 and the yoke 70. The link 80 includes a rod 82, one end of which is threadably received in the bore 72 in the yoke 70, and the other end of which is threadably received by one end of a turnbuckle 84. The other end of turnbuckle 84 receives a threaded end of a shaft 86 which is rigidly fixed to an inner plate 88. Inner plate 88 and outer plate 90 are bolted to the right side beam 22. A second locating plate 39 accurately positions the plates 88 and 90 in the fore-and-aft direction.

Draft forces applied to the draft links 30 are transmitted to the side beams 22, thus causing the side beams 22 to bend towards and away from each other. This change in separation is multiplied by the lever 62 and this multiplied displacement is transmitted to the transducer 60 by the shaft 66. Preferably, the length of link 80 is adjusted by the turnbuckle 84 so that a desired signal is produced by the transducer 60 when there are no draft forces applied to the draft links 30. Also, the draft force sensing mechanism 40 is preferable mounted as high as possible to avoid contact with debris and as close as possible to the portions of the side beams 22 which are subject to most lateral deflection.

While the invention has been described in conjunction with a specific embodiment, it is to be understood that many alternatives, modifications, and variations will be apparent to those skilled in the art in light of the foregoing description. Accordingly, this invention is intended to embrace all such alternatives, modifications, and variations which fall within the spirit and scope of the appending claims.

We claim:

1. In a tractor having a rear axle housing, a frame structure attached to the rear axle housing, the frame structure including front and rear drawbar supports and left and right side beams, each side beam having a front end rigidly attached to the front drawbar support and having an aft end rigidly attached to the rear drawbar support, and the tractor having left and right draft links, each draft link having a front end coupled to a corresponding one of the side beams and a rear end for coupling to an implement, a draft force sensing mechanism comprising:

a base plate held in spaced apart relationship to the one side beam;

a transducer plate held in spaced apart relationship to the base plate;

a displacement transducer mounted on one of the side beams, the displacement transducer being mounted in an aperture in the transducer plate;

a lever having a first end pivotally supported by the base plate and having a second end operatively engagable with the displacement transducer; and a rod having a first end fixed to the other side beam a second end coupled to the transducer so that changes in draft force cause relative movement between the rod and the transducer, the transducer responding by generating a signal representing the draft force, the second end of the rod being pivotally coupled to the lever.

2. The draft force sensing mechanism of claim 1, wherein:

the second end of the rod is coupled to the lever at a location which is between the first and second ends of the lever.

3. The draft force sensing mechanism of claim 1, wherein:

a resilient member is coupled between the lever and the rod.

4. The draft force sensing mechanism of claim 2, wherein:

said location is closer to the second end of the lever than to the first end of the lever.

5. The draft force sensing mechanism of claim 1, further comprising:

means for adjusting the length of the rod.

* * * * *